(12) United States Patent
Pennington et al.

(10) Patent No.: US 9,483,873 B2
(45) Date of Patent: Nov. 1, 2016

(54) EASY SELECTION THRESHOLD (71) Applicant: Autodesk, Inc., San Rafael, CA (US)

(72) Inventors: Joel DeStaffany Pennington, Victoria (CA); Sylvain Laroche, Quebec (CA); Qing Hu Liao, North Tower Solaris (SG)

(73) Assignee: Autodesk, Inc., San Rafael, CA (US)

( * ) Notice: Subject to any disclaimer, the term of this patent is extended or adjusted under 35 U.S.C. 154(b) by 531 days.

(21) Appl. No.: 13/850,934

(22) Filed: Mar. 26, 2013

(65) Prior Publication Data

US 2014/0292754 A1  Oct. 2, 2014

(51) Int. Cl.
*G06T 19/20* (2011.01)
*G06T 19/00* (2011.01)
*G06F 3/0481* (2013.01)
*G06F 3/0484* (2013.01)

(52) U.S. Cl.
CPC ........... *G06T 19/00* (2013.01); *G06F 3/04815* (2013.01); *G06F 3/04842* (2013.01); *G06F 3/04845* (2013.01); *G06T 19/20* (2013.01); *G06F 2203/04804* (2013.01); *G06T 2210/62* (2013.01)

(58) Field of Classification Search
None
See application file for complete search history.

(56) References Cited

U.S. PATENT DOCUMENTS

| | | | |
|---|---|---|---|
| 7,342,594 B1* | 3/2008 | Ort et al. | 345/629 |
| 8,314,790 B1* | 11/2012 | Zeiger | G06T 13/00 345/419 |
| 2006/0294475 A1* | 12/2006 | Holecek et al. | 715/781 |
| 2007/0211052 A1* | 9/2007 | Tak et al. | 345/426 |
| 2010/0115455 A1* | 5/2010 | Kim | G06F 3/04815 715/781 |
| 2010/0262930 A1* | 10/2010 | Helbling et al. | 715/771 |
| 2011/0112803 A1* | 5/2011 | Diguet et al. | 703/1 |
| 2013/0104065 A1* | 4/2013 | Stecher | G06F 3/0481 715/767 |

* cited by examiner

*Primary Examiner* — Gregory J Tryder
*Assistant Examiner* — Diane Wills
(74) *Attorney, Agent, or Firm* — Gates & Cooper LLP (57) ABSTRACT

A method, system, and computer readable storage medium/computer program product provide the ability to select an object in a three-dimensional (3D) scene. A 3D scene is displayed and consists of a first object that is displayed in the foreground and a second object that is occluded or partially occluded by the first object. An object selection option is activated. A transparency threshold value is defined for the first object. A location in the displayed 3D scene is selected. Such a location is located on a portion of the first object that occludes the second object. Based on the transparency threshold value and the location, either the first object or the second object is selected and displayed in a visually distinguishable manner.

16 Claims, 8 Drawing Sheets

EASY SELECTION THRESHOLD

BACKGROUND OF THE INVENTION

1. Field of the Invention

The present invention relates generally to computer graphics/animation/scene generation applications, and in particular, to a method, apparatus, and article of manufacture for selecting objects in a scene.

2. Description of the Related Art

Directors and layout artists use the camera as the main point of view for any shot or set of shots. This view is dependent upon many different factors, including a determination of the object of a story or what is important for the user to see, which may or may not be occluded during a particular sequence.

There may be times when a director or layout artists will need to select an object that is partially or completely occluded by a semi-transparent object. Similar to selection via an alpha matte (100%) transparent, the user is often constrained to the view from the director's camera.

To select/view an object in the prior art, a user is required to alter an entire scene in one of two ways:

(1) Changing to a different viewport or camera, performing some operation and then returning back to the main camera point of view. Such a process is error prone and time consuming.

(2) Selecting an object, hiding the object, and then repeating the selecting and hiding until the user gets to the object they want, followed by unhiding all of the objects.

Both of the above processes would need to be repeated if the desired effect was not obtained.

In other words, when working in a three-dimensional (3D) environment, layout artists must be able to select objects that are not visible (e.g., may be occluded/hidden behind other objects) in a quick and efficient manner. As a further constraint, the layout artist may be constrained (e.g., by a director) such that the camera cannot be moved around. As an example, if a layout artist is standing in the middle of a jungle scene, the director may request that the layout artist, while remaining in the current vantage point, remove the $10^{th}$ fern (behind other ferns) in the scene. The layout artist/user is required to somehow find out where the fern is located (within the scene), select the fern, and remove the fern. In the prior art, the user had a list of all objects in the scene, and was required to blindly/randomly select various objects (e.g., ferns) until the user was in the correct area of the scene and had selected the correct object. Such a prior art process is slow, inefficient, and prone to error.

In view of the above, what is needed is the ability to easily select an object that may be partially or completely occluded without having to perform multiple operations and altering/changing an entire scene.

SUMMARY OF THE INVENTION

Embodiments of the invention overcome the problems of the prior art by enabling the selection of an object in a 3D scene utilizing a depth buffer.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof, and which is shown, by way of illustration, several embodiments of the present invention. It is understood that other embodiments may be utilized and structural changes may be made without departing from the scope of the present invention.

Hardware Environment

Figure 1:
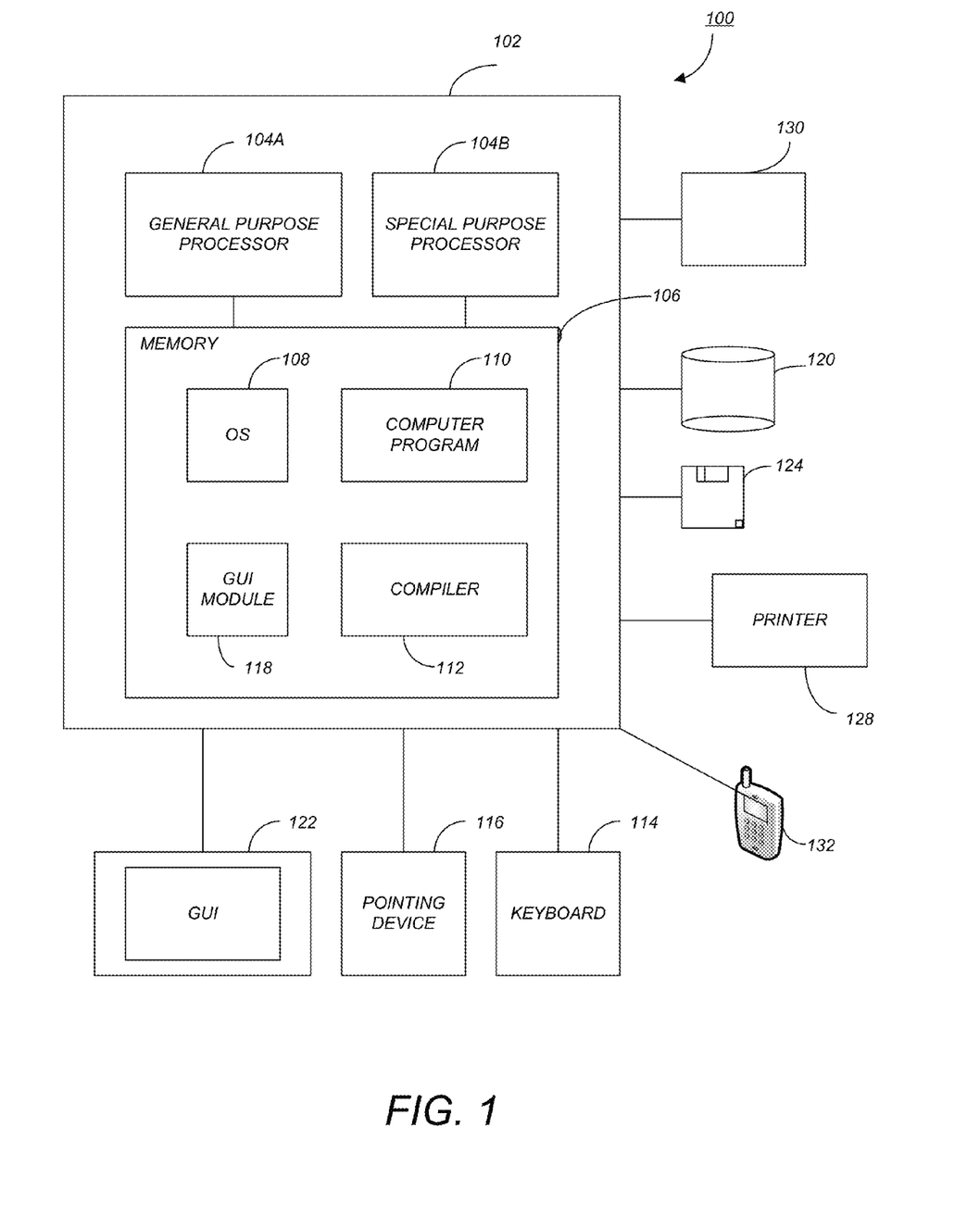
FIG. 1 is an exemplary hardware and software environment used to implement one or more embodiments of the invention.

FIG. 1 is an exemplary hardware and software environment 100 used to implement one or more embodiments of the invention. The hardware and software environment includes a computer 102 and may include peripherals. Computer 102 may be a user/client computer, server computer, or may be a database computer. The computer 102 comprises a general purpose hardware processor 104A and/or a special purpose hardware processor 104B (hereinafter alternatively collectively referred to as processor 104) and a memory 106, such as random access memory (RAM). The computer 102 may be coupled to, and/or integrated with, other devices, including input/output (I/O) devices such as a keyboard 114, a cursor control device 116 (e.g., a mouse, a pointing device, pen and tablet, touch screen, multi-touch device, etc.) and a printer 128. In one or more embodiments, computer 102 may be coupled to, or may comprise, a portable or media viewing/listening device 132 (e.g., an MP3 player, iPod™, Nook™, portable digital video player, cellular device, personal digital assistant, etc.). In yet another embodiment, the computer 102 may comprise a multi-touch device, mobile phone, gaming system, internet enabled television, television set top box, or other internet enabled device executing on various platforms and operating systems.

In one embodiment, the computer 102 operates by the general purpose processor 104A performing instructions defined by the computer program 110 under control of an operating system 108. The computer program 110 and/or the operating system 108 may be stored in the memory 106 and may interface with the user and/or other devices to accept input and commands and, based on such input and commands and the instructions defined by the computer program 110 and operating system 108, to provide output and results.

Output/results may be presented on the display 122 or provided to another device for presentation or further processing or action. In one embodiment, the display 122 comprises a liquid crystal display (LCD) having a plurality of separately addressable liquid crystals. Alternatively, the display 122 may comprise a light emitting diode (LED) display having clusters of red, green and blue diodes driven together to form full-color pixels. Each liquid crystal or pixel of the display 122 changes to an opaque or translucent state to form a part of the image on the display in response to the data or information generated by the processor 104 from the application of the instructions of the computer program 110 and/or operating system 108 to the input and commands. The image may be provided through a graphical user interface (GUI) module 118. Although the GUI module 118 is depicted as a separate module, the instructions performing the GUI functions can be resident or distributed in the operating system 108, the computer program 110, or implemented with special purpose memory and processors.

In one or more embodiments, computer program 110 may be a real-time 3D animation solution for feature film, video game, and broadcast productions (e.g., MOTION-BUILDER™ available from the assignee of the present application). Such an application may provide a professional-level solution designed for 3D data acquisition, manipulation and visualization, which makes it not only animation productivity tool, but also a tool that drives the iterative process of creativity.

In one or more embodiments, the display 122 is integrated with/into the computer 102 and comprises a multi-touch device having a touch sensing surface (e.g., track pod or touch screen) with the ability to recognize the presence of two or more points of contact with the surface. Examples of multi-touch devices include mobile devices (e.g., iPhone™, Nexus S™, Droid™ devices, etc.), tablet computers (e.g., iPad™, HP Touchpad™), portable/handheld game/music/video player/console devices (e.g., iPod Touch™, MP3 players, Nintendo 3DS™, PlayStation Portable™, etc.), touch tables, and walls (e.g., where an image is projected through acrylic and/or glass, and the image is then backlit with LEDs).

Some or all of the operations performed by the computer 102 according to the computer program 110 instructions may be implemented in a special purpose processor 104B. In this embodiment, the some or all of the computer program 110 instructions may be implemented via firmware instructions stored in a read only memory (ROM), a programmable read only memory (PROM) or flash memory within the special purpose processor 104B or in memory 106. The special purpose processor 104B may also be hardwired through circuit design to perform some or all of the operations to implement the present invention. Further, the special purpose processor 104B may be a hybrid processor, which includes dedicated circuitry for performing a subset of functions, and other circuits for performing more general functions such as responding to computer program 110 instructions. In one embodiment, the special purpose processor 104B is an application specific integrated circuit (ASIC).

The computer 102 may also implement a compiler 112 that allows an application or computer program 110 written in a programming language such as COBOL, Pascal, C++, FORTRAN, or other language to be translated into processor 104 readable code. Alternatively, the compiler 112 may be an interpreter that executes instructions/source code directly, translates source code into an intermediate representation that is executed, or that executes stored precompiled code. Such source code may be written in a variety of programming languages such as Java™, Perl™, Basic™, etc. After completion, the application or computer program 110 accesses and manipulates data accepted from I/O devices and stored in the memory 106 of the computer 102 using the relationships and logic that were generated using the compiler 112.

The computer 102 also optionally comprises an external communication device such as a modem, satellite link, Ethernet card, or other device for accepting input from, and providing output to, other computers 102.

In one embodiment, instructions implementing the operating system 108, the computer program 110, and the compiler 112 are tangibly embodied in a non-transient computer-readable medium, e.g., data storage device 120, which could include one or more fixed or removable data storage devices, such as a zip drive, floppy disc drive 124, hard drive, CD-ROM drive, tape drive, etc. Further, the operating system 108 and the computer program 110 are comprised of computer program 110 instructions which, when accessed, read and executed by the computer 102, cause the computer 102 to perform the steps necessary to implement and/or use the present invention or to load the program of instructions into a memory 106, thus creating a special purpose data structure causing the computer 102 to operate as a specially programmed computer executing the method steps described herein. Computer program 110 and/or operating instructions may also be tangibly embodied in memory 106 and/or data communications devices 130, thereby making a computer program product or article of manufacture according to the invention. As such, the terms "article of manufacture," "program storage device," and "computer program product," as used herein, are intended to encompass a computer program accessible from any computer readable device or media.

Of course, those skilled in the art will recognize that any combination of the above components, or any number of different components, peripherals, and other devices, may be used with the computer 102.

Figure 2:
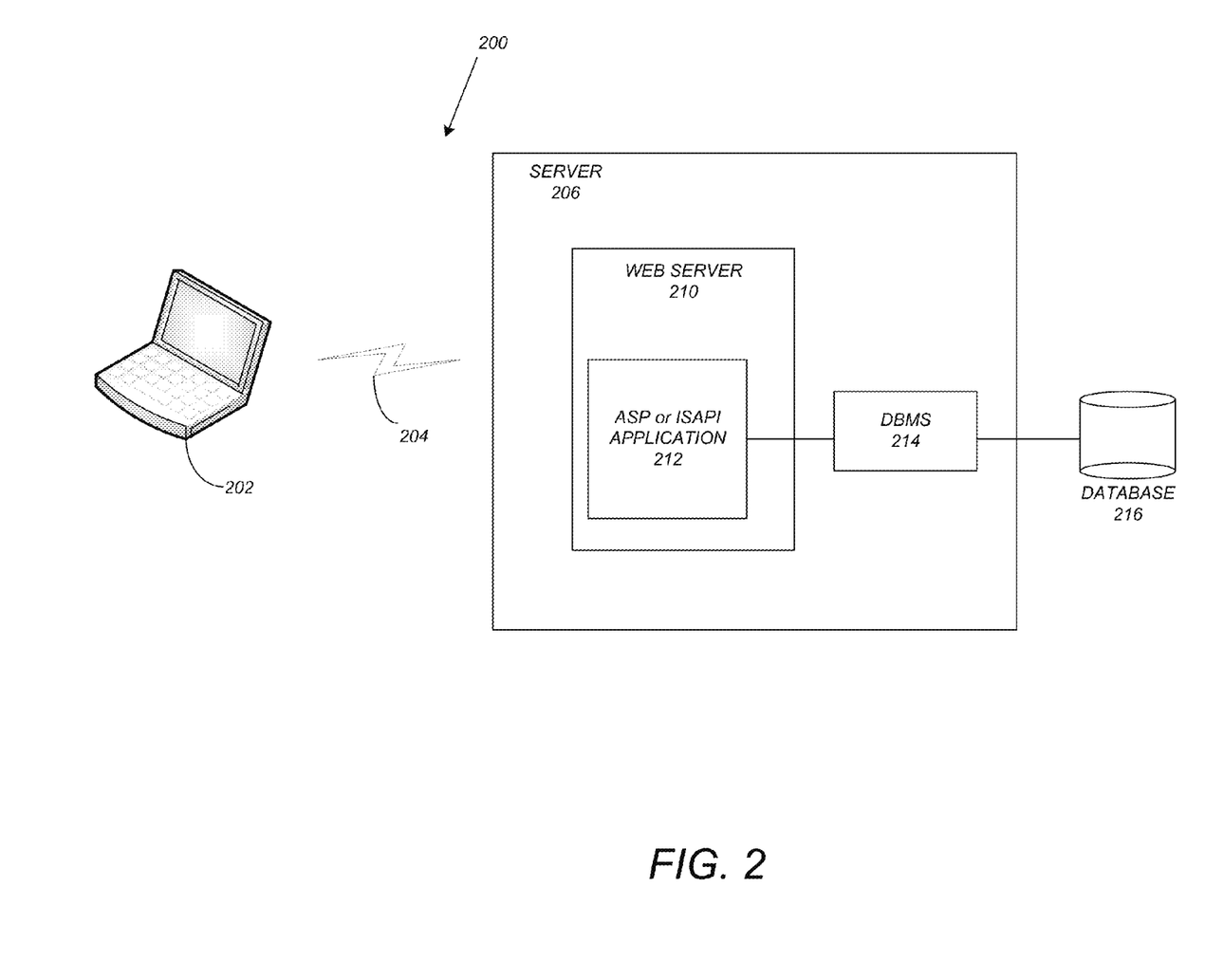
FIG. 2 schematically illustrates a typical distributed computer system using a network to connect client computers to server computers in accordance with one or more embodiments of the invention.

FIG. 2 schematically illustrates a typical distributed computer system 200 using a network 204 to connect client computers 202 to server computers 206. A typical combination of resources may include a network 204 comprising the Internet, LANs (local area networks), WANs (wide area networks), SNA (systems network architecture) networks, or the like, clients 202 that are personal computers or workstations (as set forth in FIG. 1), and servers 206 that are personal computers, workstations, minicomputers, or mainframes (as set forth in FIG. 1). However, it may be noted that different networks such as a cellular network (e.g., GSM [global system for mobile communications] or otherwise), a satellite based network, or any other type of network may be used to connect clients 202 and servers 206 in accordance with embodiments of the invention.

A network 204 such as the Internet connects clients 202 to server computers 206. Network 204 may utilize ethernet, coaxial cable, wireless communications, radio frequency (RF), etc. to connect and provide the communication between clients 202 and servers 206. Clients 202 may execute a client application or web browser and communicate with server computers 206 executing web servers 210. Such a web browser is typically a program such as MICROSOFT INTERNET EXPLORER™, MOZILLA FIREFOX™, OPERA™, APPLE SAFARI™, GOOGLE CHROMET™, etc. Further, the software executing on clients 202 may be downloaded from server computer 206 to client computers 202 and installed as a plug-in or ACTIVEX™ control of a web browser. Accordingly, clients 202 may utilize ACTIVEX™ components/component object model (COM) or distributed COM (DCOM) components to provide a user interface on a display of client 202. The web server 210 is typically a program such as MICROSOFT'S INTERNET INFORMATION SERVER™.

Web server 210 may host an Active Server Page (ASP) or Internet Server Application Programming Interface (ISAPI) application 212, which may be executing scripts. The scripts invoke objects that execute business logic (referred to as business objects). The business objects then manipulate data in database 216 through a database management system (DBMS) 214. Alternatively, database 216 may be part of, or connected directly to, client 202 instead of communicating/obtaining the information from database 216 across network 204. When a developer encapsulates the business functionality into objects, the system may be referred to as a component object model (COM) system. Accordingly, the scripts executing on web server 210 (and/or application 212) invoke COM objects that implement the business logic. Further, server 206 may utilize MICROSOFT'S™ Transaction Server (MTS) to access required data stored in database 216 via an interface such as ADO (Active Data Objects), OLE DB (Object Linking and Embedding DataBase), or ODBC (Open DataBase Connectivity).

Generally, these components 200-216 all comprise logic and/or data that is embodied in/or retrievable from device, medium, signal, or carrier, e.g., a data storage device, a data communications device, a remote computer or device coupled to the computer via a network or via another data communications device, etc. Moreover, this logic and/or data, when read, executed, and/or interpreted, results in the steps necessary to implement and/or use the present invention being performed.

Although the terms "user computer", "client computer", and/or "server computer" are referred to herein, it is understood that such computers 202 and 206 may be interchangeable and may further include thin client devices with limited or full processing capabilities, portable devices such as cell phones, notebook computers, pocket computers, multi-touch devices, and/or any other devices with suitable processing, communication, and input/output capability.

Of course, those skilled in the art will recognize that any combination of the above components, or any number of different components, peripherals, and other devices, may be used with computers 202 and 206.

Software Embodiment Overview

Embodiments of the invention are implemented as a software application on a client 202 or server computer 206. Further, as described above, the client 202 or server computer 206 may comprise a thin client device or a portable device that has a multi-touch-based display. Embodiments of the invention enable a software application to select occluded textured geometric elements in an easy and efficient manner. In this regard, selecting a textured geometric element in a dense scene can be challenging and time consuming especially if elements are occluded by other elements. Prior art methods requiring the user to change the camera view or use a navigator window to access and select element behind other elements is inefficient, particularly with large scenes.

As used herein, embodiments of the invention may utilize or manipulate the alpha channel of a 3D scene. Such an alpha channel is a portion of each pixel's data reserved for transparency information. 32-bit graphics systems contain four channels: three 8-bit channels for red, green, and blue (RGB) and one 8-bit alpha channel. An alpha-blend is an effect in which a user assigns pixel values that are solid, invisible, or partially transparent. Alpha-blending is often used in games for special effects such as explosions and weapons discharge. When mapped onto polygons, alpha-blending simulates semi-transparent objects, such as water and glass. As used herein, a transparency threshold value may refer to and/or adjust the alpha channel assigned or corresponding to a particular object/element. In this regard, the transparency of an object refers to a material property setting that defines the level of opacity for a material. The level of visibility of an object is determined by the opacity setting. When the opacity is set to 0%, the object is transparent.

As used herein, an element may be a node and represents all of the objects that make up a scene. Nodes are individual objects such as joints, bones, or nulls that are linked to a model's skeleton structure and allow a user to map between a source and a model.

As used herein, a geometry is a 3D element or object such as a geometric primitive, NURBS (non uniform rational B-splines), and/or polygonal surface (e.g., mesh). A geometric primitive is a simple 3D element or object such as a cone, a cylinder, a disc, a plane, a sphere, or a torus. NURBS are surfaces and curves that visually represent complex geometric information, used for modeling. In other words, NURBS are mathematical representations of 3D geometry that can accurately describe any shape from a simple 2D line, circle, arc, or curve, to the most complex 3D surface or solid.

As used herein, textures (such as those of a geometric element) add realistic surface detail to models without the need for complex geometry transformations. A texture may use an image or video clip and many textures can be based on the same image with different texture settings. A texture setting may allow a user to: apply images or video clips to selected models, planes, or cameras; add depth, color, and patterns to objects in a scene; adjust or animate the placement of textures on a model; and/or change the texture type for use with shaders. In other words, textures are most commonly used to simulate detail that is not part of a model's geometry, or to add static shadows and reflections.

In view of the above, a textured geometric element may be viewed as a geometric object that has a texture. Examples of textured geometric elements include any objects in a scene such as a tree, a chair, a person, etc.

To select a textured geometric element, embodiments of the invention provide a variety of methods that are all based on the use of a depth buffer (also referred to as a z-buffer). In a first method, a user may select a first object/element in a scene (wherein the first object/element is occluding one or more second objects/element). Thereafter, the user can scroll the mouse wheel (and/or use a keyboard control) to select the one or more second objects behind the first object. In other words, the mouse scroll wheel is used to sequentially select the second objects in the depth buffer that are occluded by the first object.

In a second method, a user may define an opacity threshold/level that determines the level of opacity of the objects in a scene such that a user can select through an occluding object to select a hidden/occluded (and/or partially occluded) object. Both of the methods are described below.

Element Selection through Alpha Channels

If there is a dense scene with many geometric elements, and there is a need to select a partially occluded geometric element in the background, embodiments of the invention enable the selection of the element in the background through the alpha channels of partially transparent textured geometric elements in the foreground.

Figure 3:
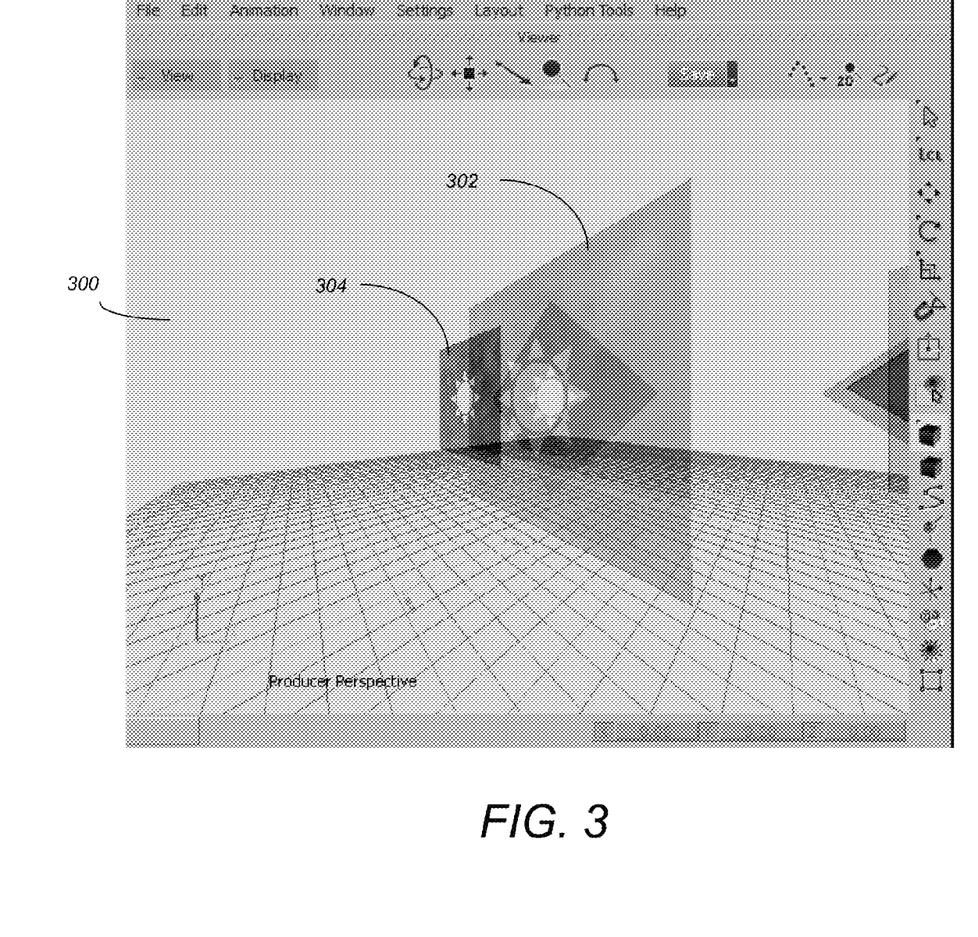
FIG. 3 illustrates partially transparent textured elements, all with an alpha channel in accordance with one or more embodiments of the invention.
Figure 4:
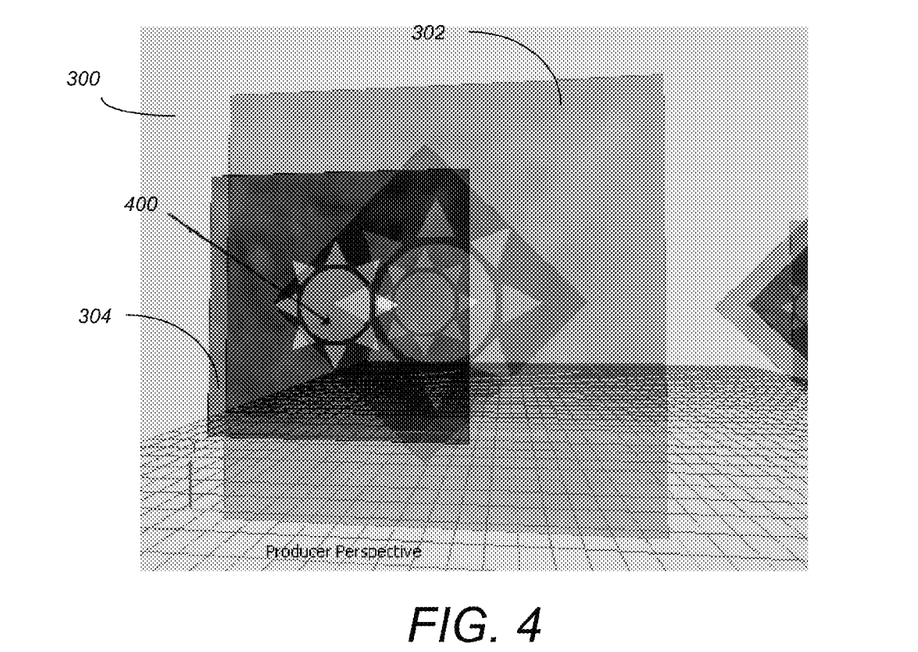
FIG. 4 illustrates the "clicking" through a foreground geometric element in accordance with one or more embodiments of the invention.
Figure 5:
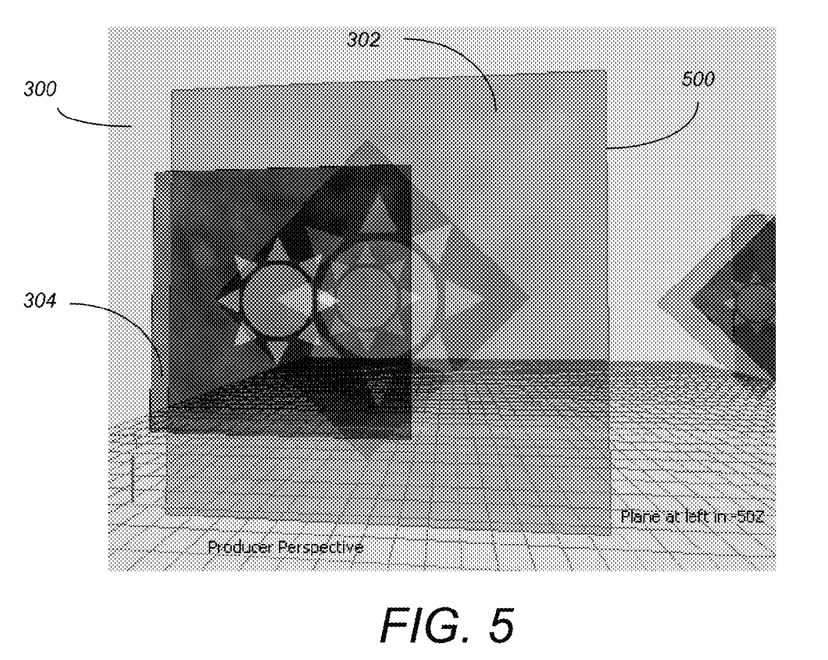
FIG. 5 illustrates the selection of a background geometric element by clicking through a foreground element in accordance with one or more embodiments of the invention.

FIG. 3 illustrates partially transparent textured elements 302-304, all with an alpha channel. The alpha channels are the sun-shape center of the geometric elements 302-304. A user may activate element selection (using an alpha channel) via icon/button selection, a keyboard shortcut, and/or other methodology. In the viewer window 300, the user clicks through the alpha channel of the textured geometric element 304 in the foreground that occludes the geometric element 302 behind it. FIG. 4 illustrates the "clicking" 400 through a foreground geometric element 304 in accordance with one or more embodiments of the invention. Since the user is clicking "through" the foreground element 304, the background geometric element 302 is selected as illustrated in FIG. 5 with a highlighted border 500.

Figure 6:
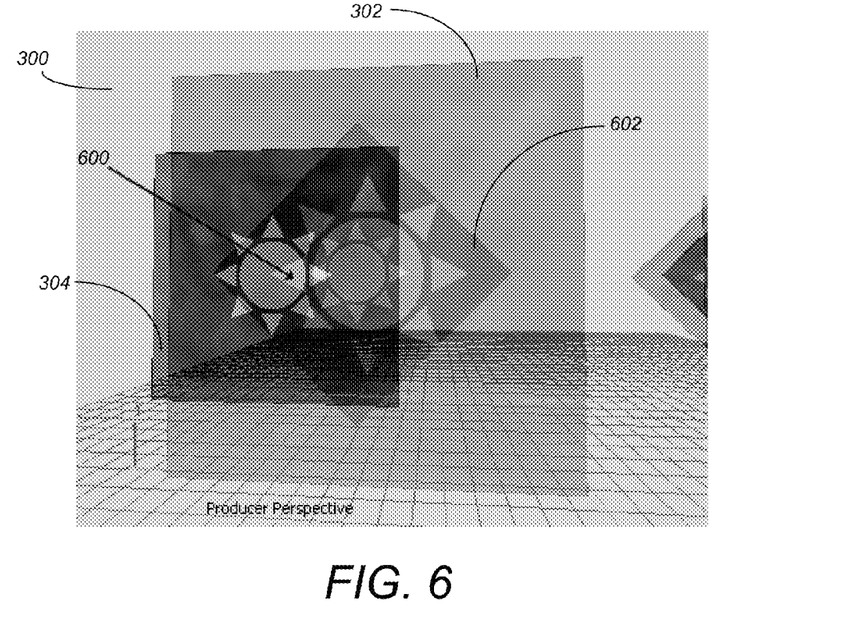
FIG. 6 illustrates a user clicking through an alpha channel of geometric elements in the foreground that occlude geometric elements in the background in accordance with one or more embodiments of the invention.
Figure 7:
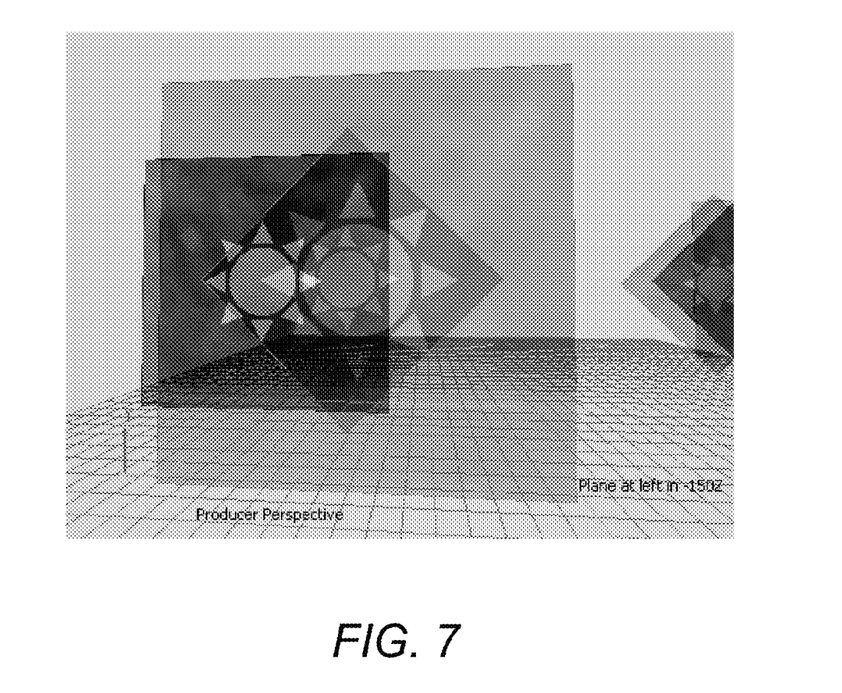
FIG. 7 illustrates the selection of a background geometric element of FIG. 6 in accordance with one or more embodiments of the invention.

Similarly, the user may also select an occluded geometric element in the viewer window 300 through multiple alpha channels. Once the selection option is activated, the user clicks 600 through the alpha channels of the geometric elements in the foreground 304 that occlude the geometric element 602 in the background that the user desires to select (e.g., as illustrated in FIG. 6). In response, the geometric element 602 in the background is shown selected as its border is highlighted (as illustrated in FIG. 7).

Such elements 302, 304, and 602 can be selected through their alpha channels or through a selection override color and transparency via an external device such as a hand-held camera. Such an option enables a user to have the option to select through alpha channels and specify the camera to use.

Element Selection through Partially Transparent Textures

The second method for selecting occluded (or partially occluded) textured geometric elements is via partially transparent textures. To use a texture's alpha channel and transparency, the geometric element may require a shader with a transparency setting type set to other than "No Transparency." Similar to selecting occluded geometric elements through alpha channels, a user can select a geometric element in the background through partially transparent textured geometric elements in the foreground by activating a selection method (e.g., using an icon/button, keyboard shortcut, and/or other methodology [e.g., a gesture using a stylus or finger on a touch screen device]) and by specifying the texture's transparency threshold.

Figure 8:
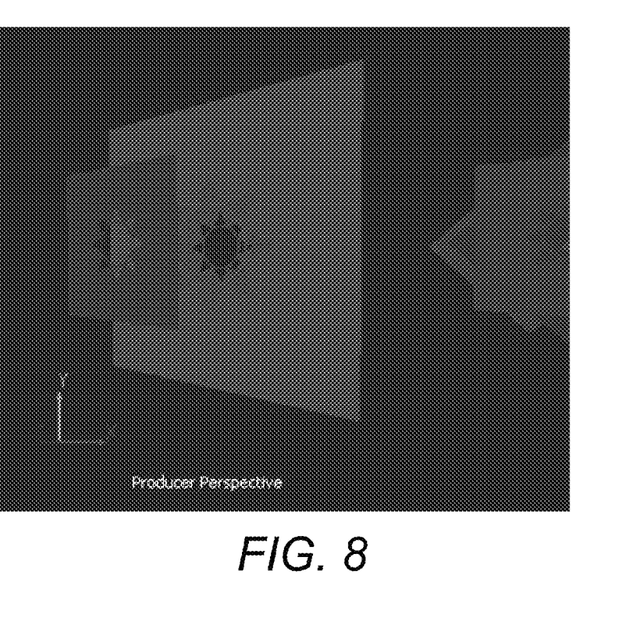
FIG. 8 illustrates the transparency threshold of textures for all geometric elements in the scene of FIG. 3 in accordance with one or more embodiments of the invention.

FIG. 8 illustrates the transparency threshold of textures for all geometric elements in the scene of FIG. 3 in accordance with one or more embodiments of the invention. As illustrated, each of the objects in the scene may be displayed in conjunction with a rectangular (or some other geometric shape) card that is semi-transparent. Such cards may be placed in the same plane as that of the object. Further, the object may be flattened such that the object does not appear to have a depth beyond that of the card it is placed upon. The rectangular cards may be utilized because it may be easier for a user to process a rectangular card (in a 3D environment) compared to that of a full 3D object. Further, the cards provide for an easier selection capability as a larger selection area is utilized (i.e., an area that may be larger than the object itself). The color/shade with which the texture of the card is displayed may be adjustable by the user. For example, rather than displaying the actual texture of the object, the texture may be modified to a solid color (e.g., red and/or a color based on a range of RGB values that can be individually set by a user).

Figure 9:
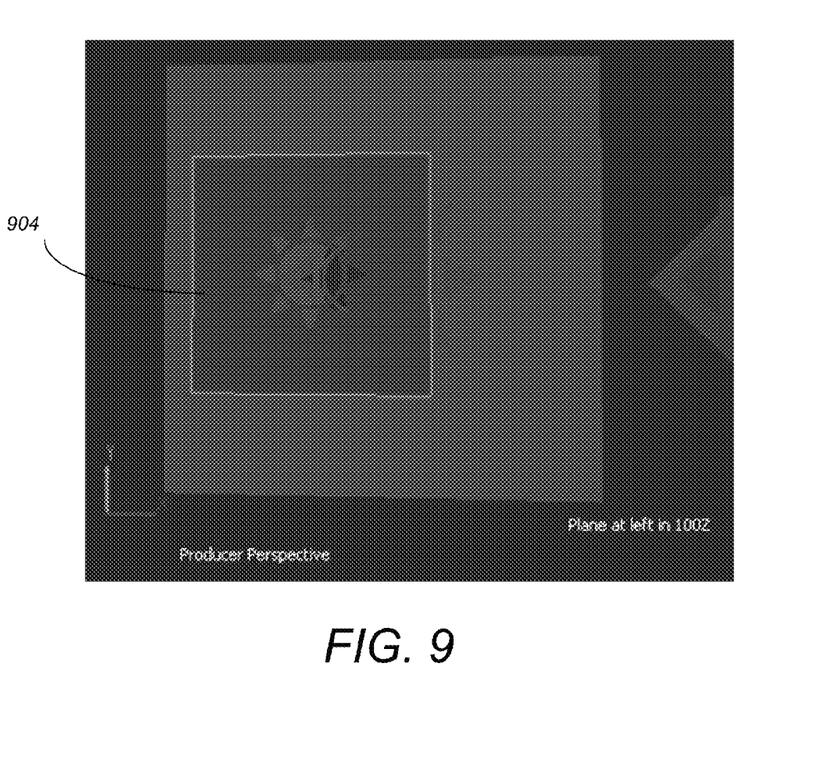
FIG. 9 illustrates a foreground object having a texture's transparency threshold of 50% in accordance with one or more embodiments of the invention.
Figure 10:
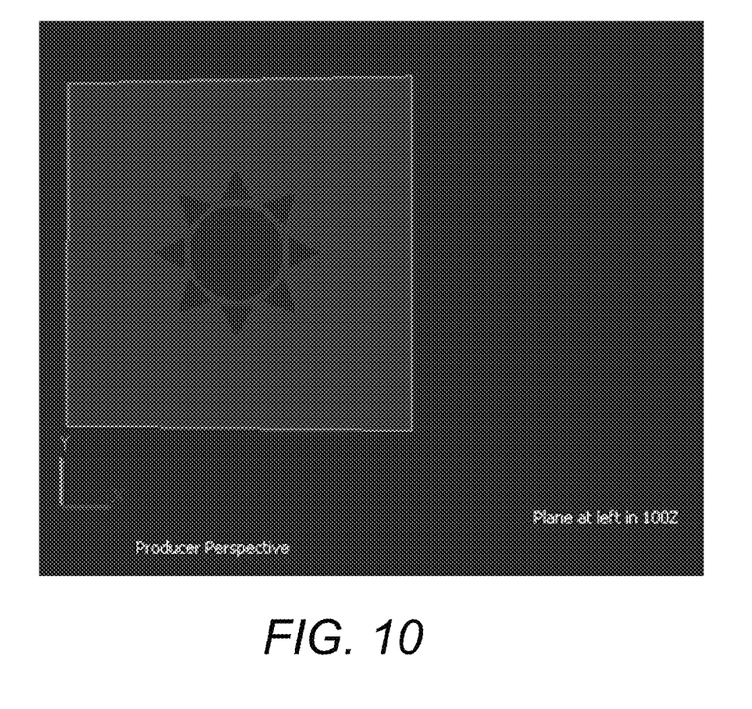
FIG. 10 illustrates a texture's transparency threshold set to 1, meaning 100% of the texture's geometry is considered when selecting occluded geometry in accordance with one or more embodiments of the invention.

The user may then have the option to display the value of the transparency threshold (i.e., of the texture of a given/selected object). As used herein, a transparency threshold is the level at which a user can no longer select through an object. The transparency threshold may be defined by a user in a variety of manners including text based on some sort of graphical user interface control. For example, a simple slider may be used that allows the user to drag a float value between 0.00 and 100.00. Setting the value to 100.00 means that any transparency will be considered. Setting the value to 50.00 means that ½ of the transparency levels will be considered. Setting the value to 0.00 means that no transparency will be considered. In other embodiments, setting a texture's transparency threshold to 0.50 means that 50% of the texture's transparency is considered when selecting occluded geometry. FIG. 9 illustrates a foreground object 904 having a texture's transparency threshold of 50% in accordance with one or more embodiments of the invention. FIG. 10 illustrates a texture's transparency threshold set to 1, meaning 100% of the texture's geometry is considered when selecting occluded geometry.

Embodiments of the invention may provide the ability to adjust the transparency threshold value via a scroll wheel of a mouse (e.g., while pressing a keyboard control such as "shift"+"A") which would adjust the threshold amount visually in the viewer. To utilize such a scroll wheel feature, the user may need to make sure that the focus is in the viewer (e.g., the user doesn't necessarily need to pick an object). In this regard, the goal is to adjust the threshold level so that the user can pick an object at the desired depth level where the object is visible. Setting the texture's transparency threshold to 1 enables a user to easily select through any of the partially transparent geometry.

By adjusting the transparency threshold, the user is moved through the Z-buffer from a defined viewing point without modifying the camera angle/view of the 3D scene. For example, if the user activates the option for element selection through partially transparent textures, a semi-transparent rectangular card superimposed/lined up with a first element in the 3D scene may be displayed. If the user clicks through the first element, a second element that was occluded by the first element may be selected. Such a selection may be displayed in a different color (e.g., selection override color) and/or a border may be highlighted (alternatively, any method that visually distinguishes a selected element from other elements may be utilized).

The user can adjust the element's texture's opacity/transparency threshold to determine the extent with which a user can click through the element. If the user adjusts the transparency threshold such that it is not transparent (e.g., to 0.0) the display may change such that the user cannot see through the selected element. As the transparency threshold value increases (e.g., from 0.0 to 1.0) (e.g., using a mouse scroll wheel), the display of first/foreground element changes such that objects occluded by the first object are displayed. As the value further increases, each successive object in the Z-buffer may be displayed. Once the user clicks on an object/element in the display, that object/element is selected. Accordingly, without moving objects in a scene, and without changing a camera angle/viewing position, the user is able to sequentially cycle through objects to be selected based on the object's position in a Z-buffer.

To explain the option in different words, one may imagine a laser beam that is projecting into a 3D scene. The laser beam represents the depth/Z-buffer. All objects/elements that intersect with the laser beam are the depth objects and the user can toggle between those objects without having to hide any other objects (e.g., merely by scrolling the mouse wheel). In this regard, the mouse wheel is utilized to scroll from object to object as long as such an object intersects with the laser beam.

Figure 11:
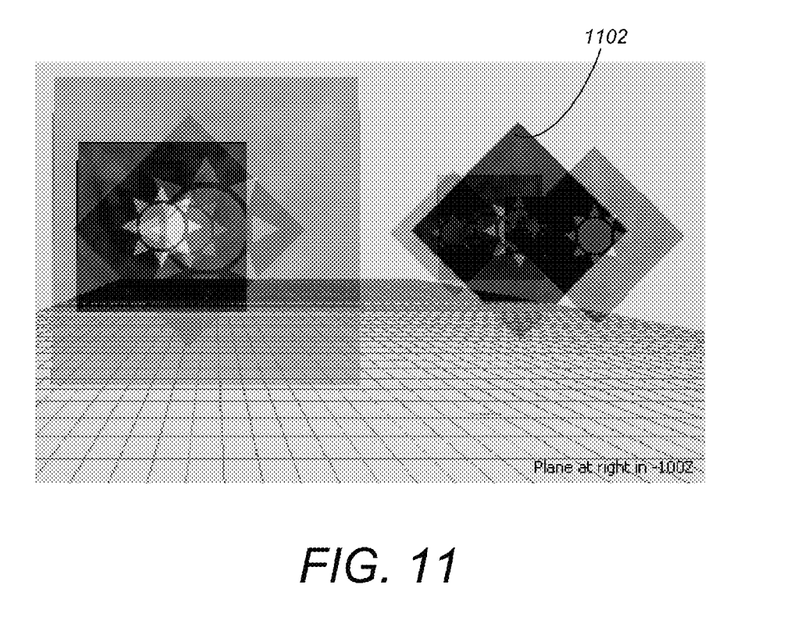
FIG. 11 illustrates a selected geometry that has a selection override color defined in accordance with one or more embodiments of the invention.

As indicated above, the user may also have the ability to set a selection override color (e.g., using the texture's diffuse channel for the color override). By setting an override color, the currently selected object/element is displayed in a different color/shade from that of other objects. In this regard, by setting a selection override color, the user can easily see which textured geometric element is selected. FIG. 11 illustrates a selected geometry 1102 that has a selection override color defined. If a user is working in a dense scene containing geometric elements with various subtle transparent textures, taking advantage of a selection override color property may optimize the selection process.

Using a selection override color, the user may also have the option to cycle through textured geometric elements (e.g., by scrolling the mouse wheel while pressing "shift" and "1"). As the mouse wheel is scrolled, the textured geometric elements with a selection override color are selected one by one using the Z-buffer.

Further to the above, the user may have the option to hide textured geometric elements in front of a selected textured geometric element (e.g., by pressing "shift" and "2"). By hiding all elements in front of a selected geometric element, the view may be cropped enabling easier element selection. The option to hide elements in front of a selected element may be used in conjunction with the scrolling option such that while elements in front of a selected element are hidden, the user can cycle through elements in the back using the Z-buffer (e.g., by pressing "shift" and "2" while scrolling the mouse wheel).

The user may also have the ability to show only the selected geometric element with a selection override color (e.g., by selecting an element and pressing "shift" and "3"). To isolate a selected geometric element and scroll through the geometric element with a selection override color (one by one), the user can click a textured geometric element (e.g., while pressing "shift" and "3" while scrolling the mouse wheel).

Logical Flow

Figure 12:
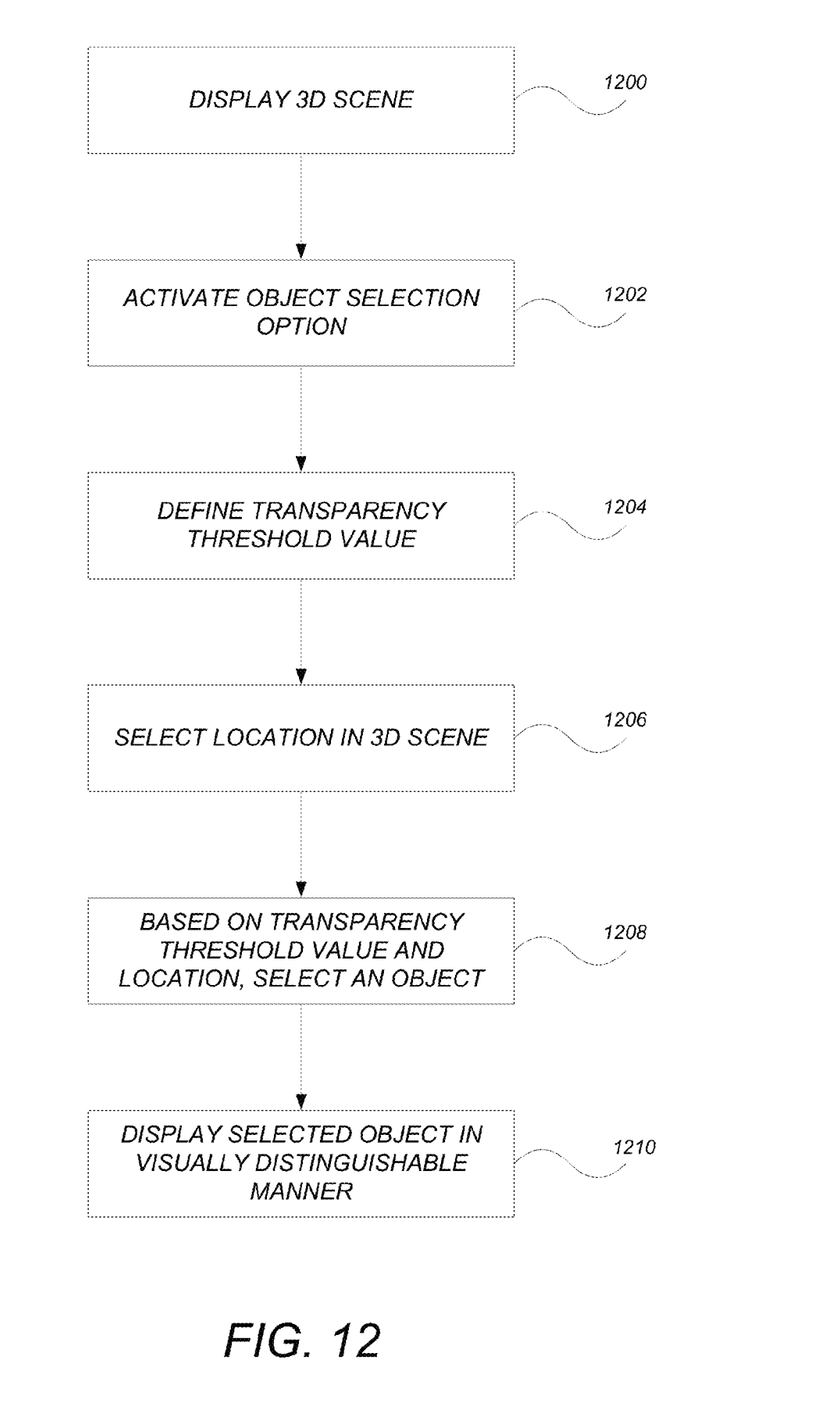
FIG. 12 illustrates the logical flow for selecting an object in a 3D scene in accordance with one or more embodiments of the invention.

FIG. 12 illustrates the logical flow for selecting an object in a 3D scene in accordance with one or more embodiments of the invention.

At step 1200, the 3D scene is displayed. The 3D scene includes a first object that is displayed in the foreground and a second object that is occluded or partially occluded by the first object. The first and second objects may both be textured geometric elements.

At step 1202, an object selection option is activated (e.g., by selecting a button or keyboard shortcut). Once activated (and in response to the activating), the two objects may be displayed within respective geometric bounding areas (e.g., a bounding box/rectangle). The displayed texture of the geometric bounding area is a defined color. Thereafter, a user may adjust the transparency threshold value (e.g., by scrolling a computer mouse wheel). As the transparency threshold value is adjusted, the displayed 3D scene is modified dynamically in real-time based on the adjusting. For example, the modifying may sequentially cycle through the objects in the 3D scene based on the adjusted transparency threshold value and transparency threshold values corresponding to each object.

At step 1204, a transparency threshold value is defined for the first object. Such a transparency threshold value corresponds to an alpha channel of the 3D scene.

At step 1206, a location in the displayed 3D scene is selected. The selected location is located on a portion of the first object that occludes the second object. To select the location, the user may click a cursor control button (e.g., of a computer mouse) while a cursor is located at the location. Alternatively, on a touch screen device, the user may simply tap (e.g., with a stylus or finger) the location.

At step 1208, based on the transparency threshold value and the location, the first object or the second object is selected. When the transparency threshold value indicates semi-transparency, the second object is selected by clicking through the first object. However, if the transparency threshold value indicates no transparency, the first object is selected.

At step 1210, the selected object is displayed in a visually distinguishable manner (e.g., by highlighting a border of the selected object). Further, a selection override color may be defined such that the selected object is displayed in the selection override color.

CONCLUSION

This concludes the description of the preferred embodiment of the invention. The following describes some alternative embodiments for accomplishing the present invention. For example, any type of computer, such as a mainframe, minicomputer, or personal computer, or computer configuration, such as a timesharing mainframe, local area network, or standalone personal computer, could be used with the present invention.

The foregoing description of the preferred embodiment of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto.

What is claimed is:

1. A computer-implemented method for selecting an object in a three-dimensional (3D) scene, comprising:
    displaying a camera angle view of the 3D scene, wherein the 3D scene comprises a first object that is displayed in the foreground and a second object that is occluded or partially occluded by the first object; and
    without modifying the camera angle view of the 3D scene:
    activating an object selection option;
    interactively defining, via interaction with a user, a transparency threshold value for the first object;
    selecting a location in the displayed 3D scene, wherein the location is located on a portion of the first object that occludes the second object;
    based on the transparency threshold value and the location, selecting the first object or the second object; and
    displaying the selected object in a visually distinguishable manner;

in response to the activating the object selection option, displaying the first object and the second object within respective geometric bounding areas, wherein a displayed texture of each geometric bounding area is a defined color;

adjusting the transparency threshold value; and modifying the displayed 3D scene based on the adjusting, wherein the modifying comprises sequentially cycling through the objects in the 3D scene based on: the adjusted transparency threshold value; and transparency threshold values corresponding to each object.

2. The computer-implemented method of claim 1, wherein the first object and the second object each comprises a textured geometric element.

3. The computer-implemented method of claim 1, wherein the selecting comprises clicking a cursor control button while a cursor is located at the location.

4. The computer-implemented method of claim 1, wherein:
when the transparency threshold value indicates semi-transparency, the second object is selected by clicking through the first object; and
when the transparency threshold value indicates no transparency, the first object is selected.

5. The computer-implemented method of claim 1, wherein the visually distinguishable manner comprises highlighting a border of the selected object.

6. The computer-implemented method of claim 1, wherein the adjusting is performed by scrolling a computer mouse wheel.

7. The computer-implemented method of claim 1, wherein the transparency threshold value corresponds to an alpha channel of the 3D scene.

8. The computer-implemented method of claim 1, further comprising:
defining a selection override color, wherein the selected object is displayed in the selection override color.

9. A non-transitory computer readable storage medium encoded with computer program instructions which when accessed by a computer cause the computer to load the program instructions to a memory therein creating a special purpose data structure causing the computer to operate as a specially programmed computer, executing a method of selecting an object in a three-dimensional (3D) scene, comprising:
displaying, in the specially programmed computer, the 3D scene, wherein the 3D scene comprises a first object that is displayed in the foreground and a second object that is occluded or partially occluded by the first object; and
without modifying the camera angle view of the 3D scene:
activating, in the specially programmed computer, an object selection option;
interactively defining, via interaction with a user, in the specially programmed computer, a transparency threshold value for the first object;
selecting, in the specially programmed computer, a location in the displayed 3D scene, wherein the location is located on a portion of the first object that occludes the second object;
based, in the specially programmed computer, on the transparency threshold value and the location, selecting the first object or the second object; and
displaying, in the specially programmed computer, the selected object in a visually distinguishable manner;
in response to the activating the object selection option, displaying the first object and the second object within respective geometric bounding areas, wherein a displayed texture of each geometric bounding area is a defined color;
adjusting the transparency threshold value; and
modifying the displayed 3D scene based on the adjusting, wherein the modifying comprises sequentially cycling through the objects in the 3D scene based on: the adjusted transparency threshold value; and transparency threshold values corresponding to each object.

10. The computer readable storage medium of claim 9, wherein the first object and the second object each comprises a textured geometric element.

11. The computer readable storage medium of claim 9, wherein the selecting comprises clicking a cursor control button while a cursor is located at the location.

12. The computer readable storage medium of claim 9, wherein:
when the transparency threshold value indicates semi-transparency, the second object is selected by clicking through the first object; and
when the transparency threshold value indicates no transparency, the first object is selected.

13. The computer readable storage medium of claim 9, wherein the visually distinguishable manner comprises highlighting a border of the selected object.

14. The computer readable storage medium of claim 9, wherein the adjusting is performed by scrolling a computer mouse wheel.

15. The computer readable storage medium of claim 9, wherein the transparency threshold value corresponds to an alpha channel of the 3D scene.

16. The computer readable storage medium of claim 9, further comprising:
defining a selection override color, wherein the selected object is displayed in the selection override color.

* * * * *